United States Patent [19]

Durand

[11] Patent Number: 5,780,745

[45] Date of Patent: Jul. 14, 1998

[54] ACOUSTIC PRESSURE GRADIENT SENSOR

[75] Inventor: Didier Durand, Versailles, France

[73] Assignee: Giat Industries, Versailles, France

[21] Appl. No.: 702,436

[22] PCT Filed: Feb. 9, 1996

[86] PCT No.: PCT/FR96/00217

§ 371 Date: Nov. 18, 1996

§ 102(e) Date: Nov. 18, 1996

[87] PCT Pub. No.: WO96/24825

PCT Pub. Date: Aug. 15, 1996

[30] Foreign Application Priority Data

Feb. 10, 1995 [FR] France ............... 95 01579

[51] Int. Cl.[6] ........................... G01L 11/00
[52] U.S. Cl. ............... 73/702; 73/649; 73/592
[58] Field of Search .............. 73/702, 703, 704, 73/649, 644, 660, 658, 592

[56] References Cited

U.S. PATENT DOCUMENTS

| 3,732,535 | 5/1973 | Ehrlich | 340/10 |
|---|---|---|---|
| 4,368,525 | 1/1983 | Obara et al. | 367/165 |
| 4,751,848 | 6/1988 | Miyamoto | 73/660 |
| 5,231,866 | 8/1993 | Peacock | 73/592 |
| 5,452,264 | 9/1995 | Holroyd | 73/644 |

FOREIGN PATENT DOCUMENTS

| A-42 10 214 | 9/1993 | Germany. |
| A-1 157 462 | 5/1985 | U.S.S.R. |
| A-2 151 879 | 7/1985 | United Kingdom. |
| A-2 186 154 | 8/1987 | United Kingdom. |

Primary Examiner—Richard Chilcot
Assistant Examiner—Max H. Noori
Attorney, Agent, or Firm—Oliff & Berridge, PLC

[57] ABSTRACT

An acoustic pressure gradient sensor able to detect a sound signal. The sensor includes a mechanical-acoustic device formed of a sphere that has omnidirectional sensitivity to the pressure gradient, an electromechanical device that accommodates the mechanical-acoustic device and that transforms the stresses into electrical impulses, and an electronic device to process the electrical impulses. The electromechanical device is formed of two printed circuits that incorporate low noise amplifiers. The printed circuits are separated by beams. The arrangement of the beams marks out a triangular structure. Each of the beams carries a gauge to measure the stresses.

9 Claims, 2 Drawing Sheets

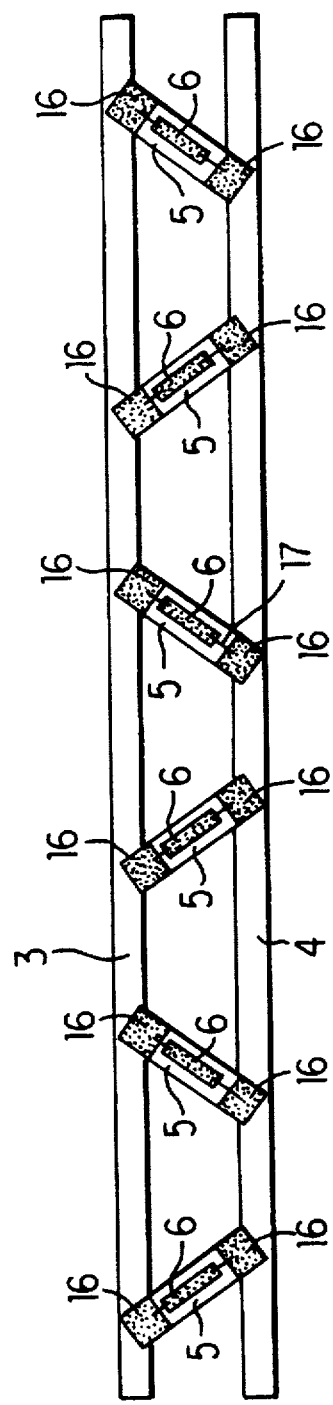

ACOUSTIC PRESSURE GRADIENT SENSOR

FIELD OF THE INVENTION

The technical scope of the present invention is that of acoustic pressure sensors sensitive to the amplitude and direction of the incident sound wave front.

BACKGROUND OF THE INVENTION

Conventional acoustic sensors, such as pressure or pressure gradient microphones, supply analogous voltage (scalar) whose strength is the result of the product of the contributions of each source of sound present in the detection area under consideration.

A microphone always comprises a mechanical-acoustic part which ensures the conversion of the acoustic energy into mechanical energy and an electromagnetic part which ensures the conversion of the mechanical energy into electrical energy.

According to the pass-range required and the operational environment (air, water), the technologies employed are very varied: dynamic microphone, capacitor microphone, of the electric type for example, carbon microphone, crystal microphone, stress gauge microphone, polyvinyldifluorate (crystal) microphone.

There are two distinct types of sensors:

sensors which measure the incident wave pressure with respect to the mean ambient pressure, and pressure gradient sensors which measure the difference in pressure in the pressure wave at two points close together.

The direction of the source of sound is difficult to determine using a scalar sensor. To determine the direction, a mechanical scan is generally carried out with a directional microphone. The disadvantage of this mode of operation lies in the non-observation of certain phenomena since the sensor is only receptive in a single direction at any one time.

According to another process, a certain number of microphones are grouped together in a given geometric shape and the signals received are utilized by processes implementing phase shifts between signals. Understandably, the electronics required for this process are substantial.

SUMMARY OF THE INVENTION

The aim of the present invention is to supply an acoustic pressure gradient sensor both amplitudesensitive and direction-sensitive to external fields to which it is applied.

A further aim of the present invention is to propose a sensor providing information related to all the sources of sound in the surrounding space.

The subject of the invention is thus an acoustic pressure gradient sensor able to detect a sound signal, characterised in that it comprises:

a mechanical-acoustic means formed of a sphere which has omnidirectional sensitivity to the pressure gradient, an electromechanical means which accommodates the mechanical-acoustic means intended to transform the stresses into electrical impulses, and electronic means to process these impulses.

According to one embodiment of the invention, the electromechanical means is formed of two printed circuits incorporating low noise amplifiers separated by beams marking out a triangular structure, each of which carries a gauge to measure the stresses, and the mechanical-acoustic means is formed of a sphere made of a relatively thin synthetic material, which has a diameter approximately ten times less than that of the wave length of the incident sound radiation.

The sensor comprises six beams marking out the triangular structure, producing six electric voltages containing the directional data of the source of sound.

Generally speaking, the sphere is for example bonded in a circular recess on one of the printed circuits, preferably the upper printed circuit, the centre of said recess matching the centre of gravity of the points of contact between the beams and the upper printed circuit, the electromechanical means being fastened for example on a metallic support by means of braces, the assembly being acoustically insulated by a sheet of synthetic foam. The stress gauges are for example formed of bars of silicon and the beams of ceramic with metallized ends.

A first advantage of the present invention lies in the fact that the sensor is omnidirectionally sensitive to pressure gradients.

Another advantage lies in the fact that a pressure wave reaching the sphere produces a distribution of the pressure field over the surface of the sphere such that the resultant force produces a vibration in the centre of gravity of the latter, characteristic of the direction of the incident wave.

BRIEF DESCRIPTION OF THE DRAWINGS

Other characteristics and advantages will become apparent from reading the additional description, given by way of example with respect to the drawings, in which:

FIG. 3 is an illustration of the unfolded over 360° electromechanical means.

DETAILED DESCRIPTION OF THE PREFERRED EMBODIMENTS

Figure 1:
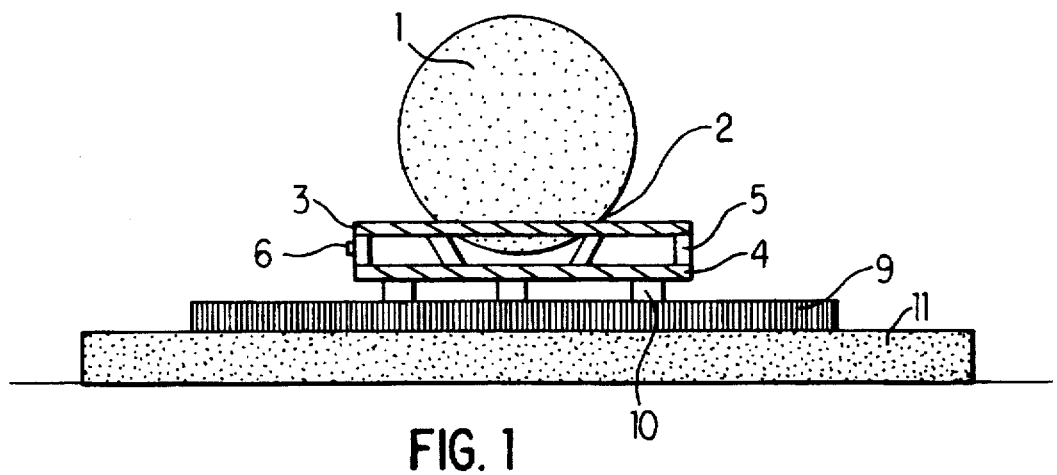
FIG. 1 is a schematic representation of the sensor.

The sensor shown in FIG. 1 comprises a sphere 1 forming the best part of the mechanical-acoustic means. This sphere 1 is made of a synthetic material of the carbon fibre, polyvinyl chlorate (PVC), glass type, which has a mass of around one gram. The sphere wall has a thickness of somewhat less than 1/10 mm. These values enable the definition of a wave sensor of the audiophonic range in the air. Generally speaking, the sphere 1 is chosen according to the pressure wave required to be measured or detected and its diameter is roughly ten times smaller than the wave length of the sound radiation in question. This sphere 1 is bonded in a recess 2 of an upper printed circuit 3. This printed circuit 3 is integral with a lower printed circuit 4 of the same kind, fitted with low noise preamplifiers. Advantageously, these preamplifiers are arranged on the lower printed circuit 2. Between these two circuits six beams 5 are arranged in a triangular structure. A stress gauge 6 formed of a bar of silicon is bonded on these beams 5. The beam 5 itself is for example made of ceramic with metallized ends. The metallization of the beam 5 acts as an electric change for the gauges 6 and a mechanical fastening to the printed circuit. The lower printed circuit 4 is for example fitted with six low noise amplifiers and rests on a metallic support 9 by means of braces 10. The support 9 thus has strong inertia enabling the stress transmitted by the sphere 1 to be measured, these stresses being characteristic of the acoustic wave. The sensor assembly is thereafter insulated acoustically from its surroundings, for example by a sheet 11 of the synthetic foam type.

Figure 2:
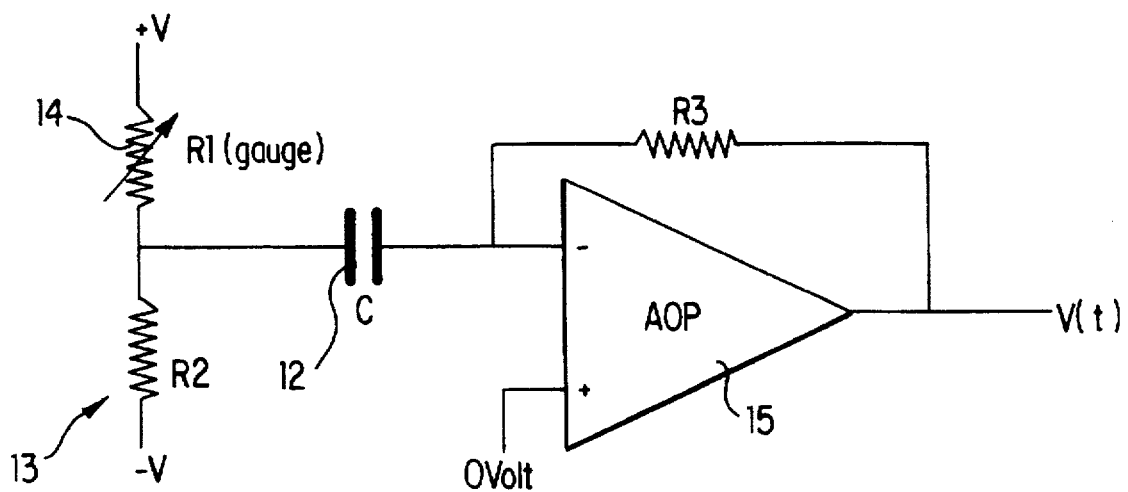
FIG. 2 illustrates the electronic means to condition the impulses on a beam.

FIG. 2 shows an example of electronic conditioning means associated with each beam 5. They are formed of a capacitor 12 in contact with a first circuit 13 including the adjustable resistance 14 showing the gauge 6 and an operational amplifier 15 mounted as a high-pass filter amplifier as shown in the drawing. This amplifier delivers an output voltage V(t) used in the matrix defined hereafter.

The unfolding over 360° of the beams 5 shown in FIG. 3 illustrates the triangular structure. The beams 5 made of ceramic have a metallic coating 16 over their ends which enables them to be soldered to the printed circuits 3 and 4. Each gauge 6 is bonded onto a corresponding beam, the electric circuit being closed by wires 17 connecting the gauge to the coatings 16.

The sensor thus made supplies a vector of six analogous voltages V(t) which represent the vectorial total of all the sources of sound in the surrounding space. These six voltages contain the directional data of the source of sound, that is after processing as indicated hereafter the directional data concerning this source of sound is located. In the case of a travelling (or spherical if the source is at a distance from the sensor) plane sound wave, knowing the transfer matrix |M| of the sensor enables the direction to be calculated in spherical coordinates D=f(r, q, j), where r is an amplitude of the sound wave, q represents a site (0 to p) and j represents an azimuth (−p/2 to +p/2).

When the pressure wave hits the sphere 1, the distribution of the pressure field over its surface is such that the resultant force produces a vibration of the latter's centre of gravity which is characteristic of the direction of the incident wave. This force is thereafter transmitted to the electromagnetic part thanks to the rigid attachment described hereafter. Since the attachment of the sphere 1 does not encompass its centre of gravity a moment component appears. The stresses are transmitted to the electromagnetic part by the sphere 1 and the metallic support 9 acts as a static force reference because of its strong inertia.

The stresses transmitted by the sphere 1 can be represented by a torque T(t). Thanks to the triangular structure of the beams, the torque creates tension/compression stresses on the gauges which generate variations in resistance which, after conditioning, become electric voltages V(t). In the pass range of the sensor connected to the diameter of the sphere, the torque generates a vectorial response of the type:

V(t)=|M|×T(t)
   where |M| is the 6×6 matrix transfer of the sensor.
   Knowing V(t) which is the vector supplied by the six gauges of the sensor, the wrench is calculated:
   Tx(t)
   Ty(t)
   Tz(t)
   T(t)=|M|$^{-1}$×V(t)=Mx(t)
   My(t)
   Mz(t)

The matrix |M| must naturally be known.

One way to know |M| is to proceed by a means of identification on a test bench. Using this technique the sensor is subjected to a series of known torques (T(t)). Then the generalised least error squares method is used to determine the matrix |M|. As the number of trials can be much greater than required by the matrix to be determined, pseudo-inverse method is used:

|M|=[V$^T$ V] $^{-1}$V$^T$.T

The three components of the torque Tx(t), Ty(t) and Tz(t) are the three force components in a Cartesian reference connected to the centre of gravity G of the sphere 1. Using values Tx(t), Ty(t) and Tz(t) a further pass is made using spherical coordinates using classical transformation formulae.

This sensor can be used in acoustic surveillance and location applications which require a vectorial microphone such as is described hereafter:
   intelligent mines to locate and monitor vehicles (trucks, tanks . . . ),
   property surveillance,
   detection and location of shoals of fish,
   if the sensor is fitted to a mobile device, it can be used as a six axis accelerometer (the sphere acting in this case as a seismic mass),
   used in tandem, it can not only locate but also estimate the distance from the source of sound.

I claim:

1. An acoustic pressure gradient sensor able to detect a sound signal, comprising:
   mechanical-acoustic means formed as a sphere which has omnidirectional sensitivity to a pressure gradient,
   electromechanical means which accommodates the mechanical-acoustic means intended to transform stresses into electrical impulses, and
   electronic means to process the electrical impulses, wherein the electromechanical means is formed of an upper printed circuit and a lower printed circuit, the upper and lower printed circuits incorporating low noise amplifiers, the upper and lower printed circuits separated by beams marking out a triangular structure, each of the beams carrying a gauge to measure the stresses.

2. The acoustic pressure gradient sensor according to claim 1, wherein the electromechanical means is fastened on a metallic support by means of braces, the electromechanical means and the metallic support forming an assembly, the assembly being acoustically insulated by a sheet of synthetic foam.

3. The acoustic pressure gradient sensor according to claim 1, wherein the mechanical-acoustic means is formed of a sphere made of a relatively thin synthetic material.

4. The acoustic pressure gradient sensor according to claim 3, wherein the sphere (1) has a diameter approximately ten times less than that of the wave length of the incident sound radiation.

5. The acoustic pressure gradient sensor according to claim 3, wherein the electromechanical means comprises six beams marking out the triangular structure, the six beams producing six electric voltages containing directional data of the sound signal.

6. The acoustic pressure gradient sensor according to claim 3, wherein the sphere is bonded in a circular recess on one of the upper and the lower printed circuits.

7. The acoustic pressure gradient sensor according to claim 6, wherein the sphere is integral with the upper printed circuit.

8. The acoustic pressure gradient sensor according to claim 7, wherein a center of the circular recess matches a center of gravity of points of contact between the beams and the upper and lower printed circuits.

9. The acoustic pressure gradient sensor according to claim 4, wherein the gauges are formed of bars of silicon and the beams are formed of ceramic with metallized ends.

* * * * *